Sheet 3. 4 Sheets.

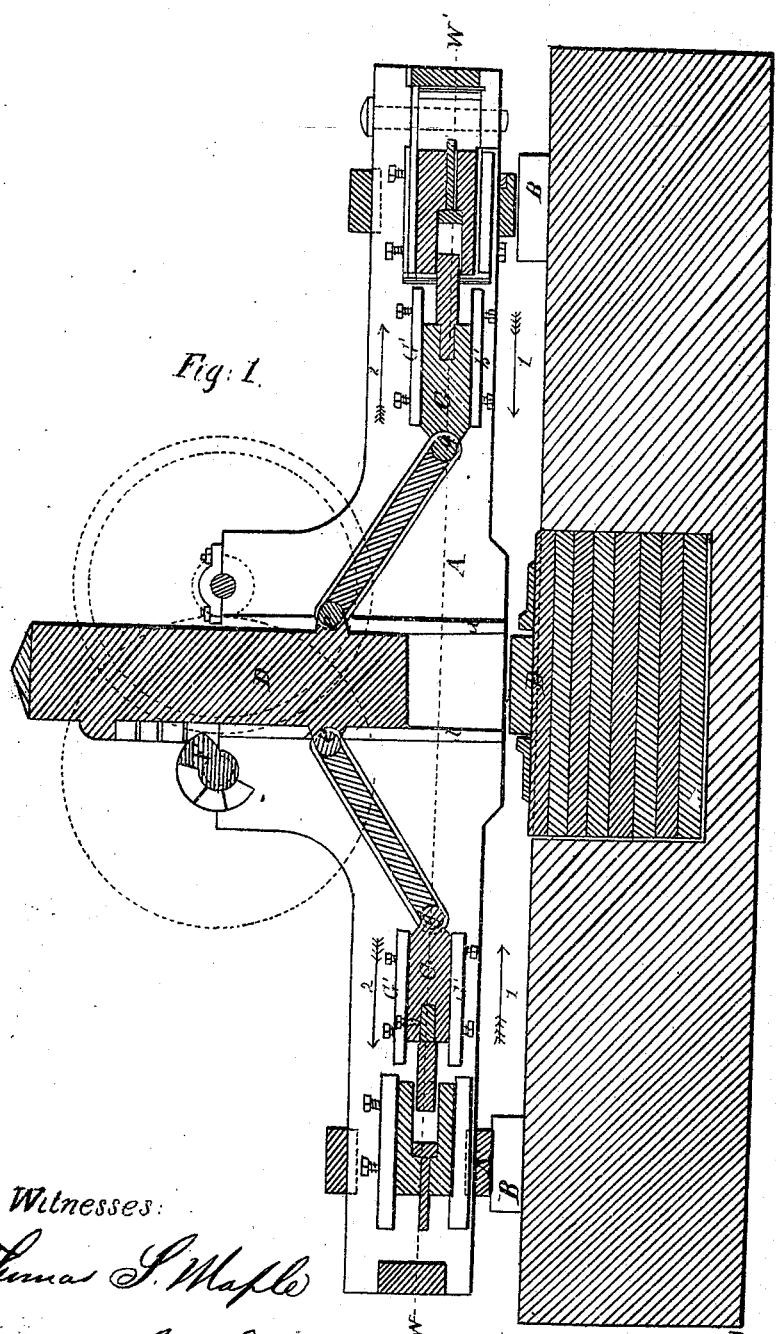

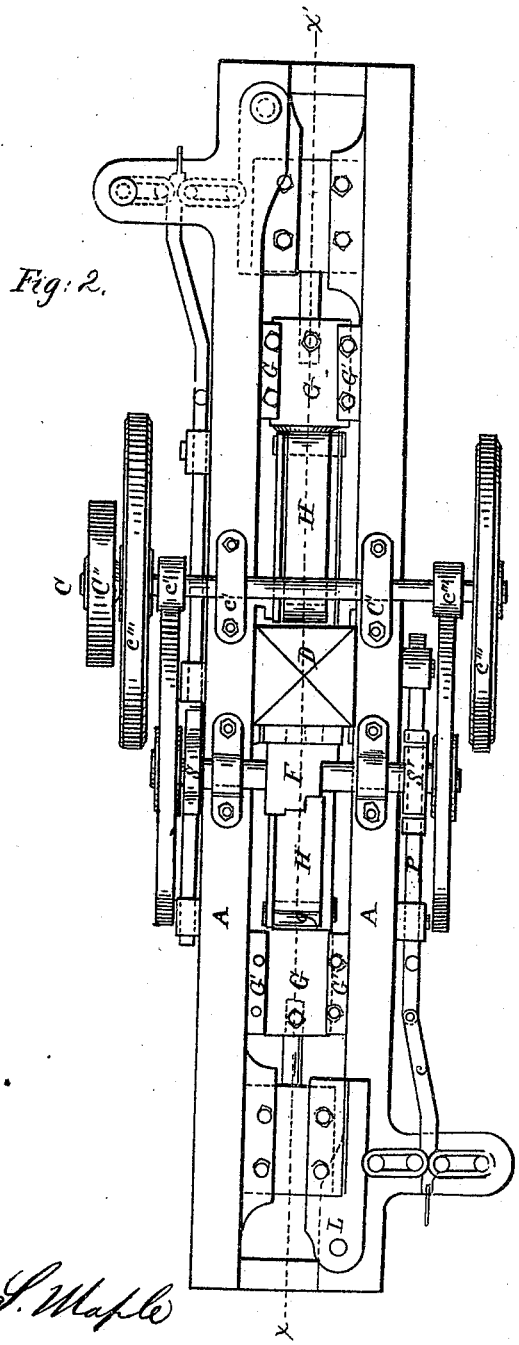

A. Alexander.
Bolt Making Machine.
N° 72152.  Patented Dec. 17, 1867.

Witnesses: Thomas S. Maple, Benjamin McLain

Inventor: Abram Alexander

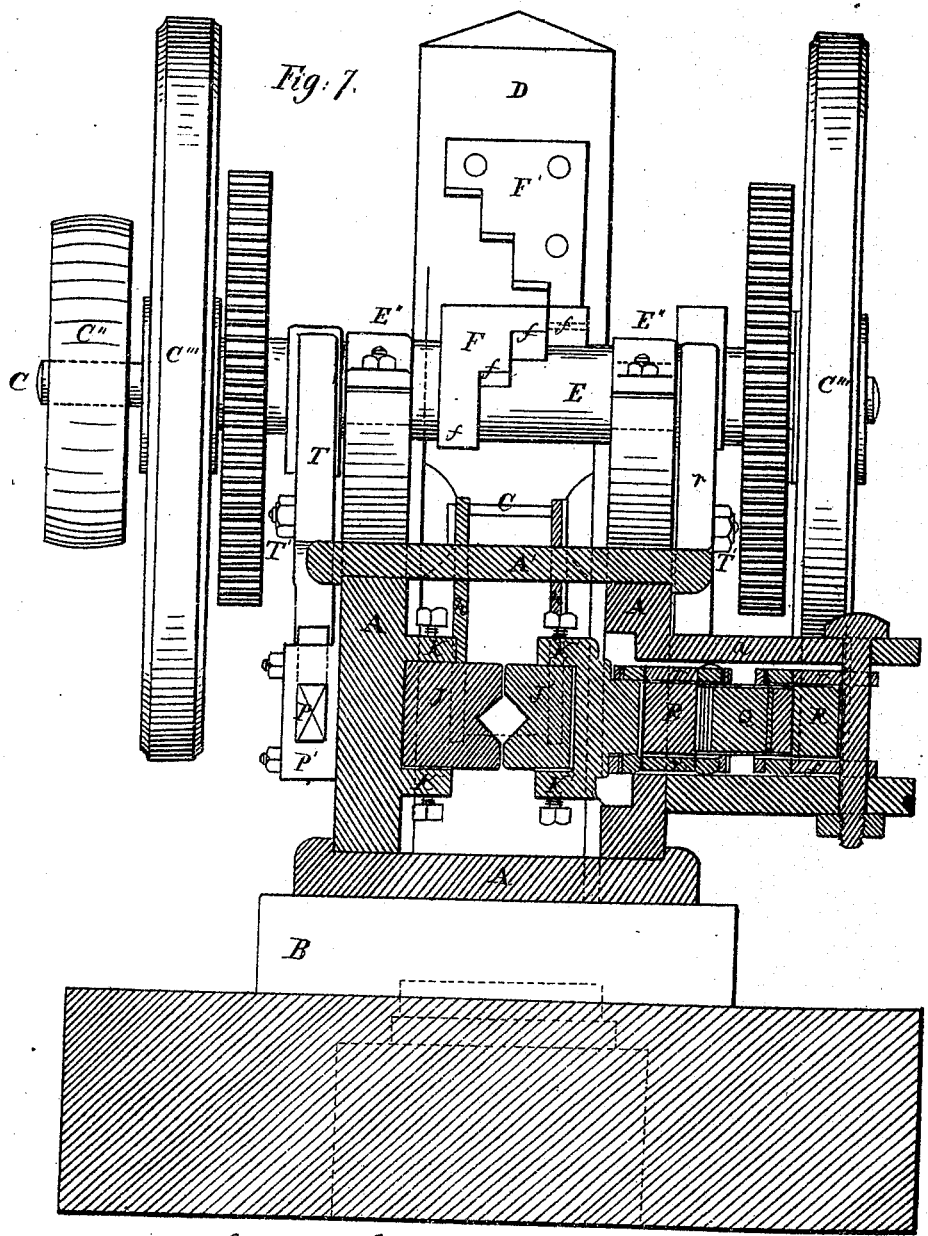

United States Patent Office.

ABRAM ALEXANDER, OF PITTSBURG, PENNSYLVANIA.

Letters Patent No. 72,152, dated December 17, 1867.

IMPROVED BOLT-MAKING MACHINE.

The Schedule referred to in these Letters Patent and making part of the same.

TO ALL WHOM IT MAY CONCERN:

Be it known that I, ABRAM ALEXANDER, of the city of Pittsburg, in the county of Allegheny, and State of Pennsylvania, have invented certain Improvements in Bolt-Making Machines; and I do hereby declare that the following is a full and exact description thereof, reference being had to the accompanying drawings, in which—

Figure 1, plate 1, represents a sectional view in elevation of my improved bolt-making machine, through the line $x\, x'$.

Figure 2, plate 1, is a top view of the same.

Figure 3, plate 2, is a sectional elevation of one end of my improved bolt-making machine, through $z\, z'$, drawn on a larger scale than figs. 1 and 2.

Figure 4:
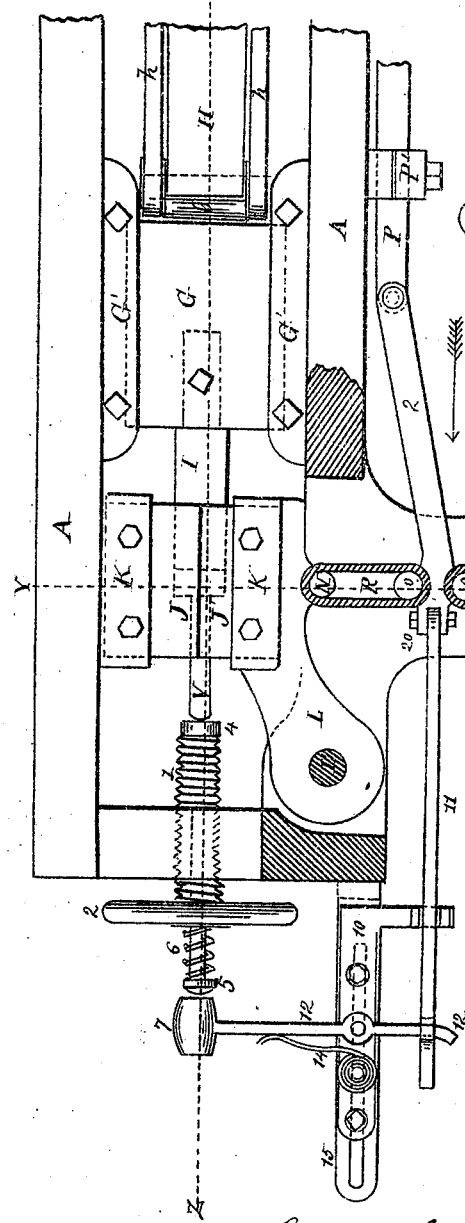
Figure 4 is a top view of the same, with part removed to show the working parts.

Figure 7, plate 3, is an end view, with a part removed, leaving a section through the line $Y\, Y'$ of fig. 4.

This invention relates to that class of machines in which bolts are made by compressing, with a plunger or heading-tool, or die, a bar of heated iron, clamped in griping-dies; and the improvement consists in the combination of mechanical devices by which the pressure on the heading-die or plunger is applied, in the arrangement for holding the griping-dies, and in the device for regulating the length of the bolts made, and for driving out the finished bolt from the dies; by which improvement bolts are made more perfect, and at a single blow, with great rapidity, and with less expenditure of power than in the machines now in use.

Description.

A is the frame of the machine, composed of frame-pieces, fastened strongly together by the pieces A′ A′ A′ A′. The frame A is constructed so as to resist a powerful strain in a longitudinal direction, and it is, by its massive section A and strong clamp-braces A′ A′, fig. 7, calculated also to resist a strong lateral pressure without spreading apart. The whole machine is placed on blocks B B, and it has under its centre a cushion, B′, formed by a pile of timber placed in a pit dug for that purpose.

I have classified my improvements under three heads. They are—

Firstly, a combination of mechanical devices for obtaining an instantaneous and powerful pressure. D is a heavy drop-piece, having a free, vertical motion in guide-strips $d\, d$, fastened or cast on the frame A. C is a shaft, mounted on pillow-blocks C′ on the frame A, and having on it a pulley, C″, or other gearing to give it motion, two fly-wheels, C‴ C‴, and two pinions, C‴′ C‴′. E E are cog-wheels, gearing with the pinions C‴′ C‴′, and communicating motion to the shaft E′, which is mounted on suitable blocks E″ E″. F is a combined cam, composed of several cams $f f f f$, arranged side by side, and corresponding to a notched block, F′, fastened to the drop-piece D. Each notch $f f f$ of the cam F has only a small throw or stroke, so as to obtain a powerful action on the piece D, but as each notch takes up the drop D where the former one held it, to carry it one step higher, the full lift of the piece D is accomplished with a very small amount of power expended. When the last cam $f$ clears the block F′, (see fig. 1,) the drop-piece D, which is now fully elevated, falls freely upon the cushion B′, and remains there until it is again taken up by the action of the compound cam F. The piece D is provided with two knuckle-pieces, $e\, e$, as seen on figs. 1, 2, and 7. G G are bolts or shoving-heads, sliding in suitable guides G′ G′, fastened to the frame A in such a manner that the bolts G G will have a free horizontal motion only in the direction of the line $x\, x'$, $z\, z'$, or $w\, w'$. The bolts G G have knuckles $g\, g$, like the ones of the piece D, and between the knuckles $g$ and $e$ are fitted the pieces H H, having their ends made so as to fit said knuckles. Iron links or straps $h\, h$ are fitted to projections on the knuckles $g$ and $e$, so as to retain the pieces G G and drop-piece D together, so that if the piece D is elevated, the two pieces G G are moved in the direction of the arrow No. 1, and when the piece D falls, the two pieces G G are pushed in the direction of the arrow No. 2, with a force increasing as the piece D advances in its fall by the weight of the piece D, by its velocity and by the position of the pieces H H, until, when the pieces H H are horizontal, the pieces G G have accomplished their stroke. To the pieces G G are attached the plunger or dies I I, made of any shape or construction required for the object in view. The pressure produced by dies fastened to the pieces G G on heated iron, griped in dies held stationary to the frame A, is so great and instantaneous, that before the iron has time to cool it is forced in every part of the cavity left for forming the head of the bolt, and thus at one operation a perfect and sound-headed bolt is produced.

Secondly, mechanical combination for obtaining efficient griping-die holders. J represents the stationary, and J' the movable griping-dies, made of any shape, material, or construction, but opening in two halves in a horizontal manner. The die J is held perfectly stationary in proper ledges K K by set-screws and fillers, placed between the frame A and the die J. The movable die J' is firmly held by proper set-screws, wedges, or keys in the jaws K' of the movable piece L. Z' is a bolt, passing through the piece L, and also through the frame A, which, in that place, is recessed out to allow of the piece L being fitted therein. The bolt L' acts as a centre for the piece L to swing on, and it prevents said piece from having any play in the direction of the line z z'. M is a bolt, passing through two extensions, a a, of the frame A, and located on a line, Y Y, which is at right angles with the line z z', and opposite, or nearly so, to the centre of resistance of the dies J J'. The movable piece Z has a knuckle, N, on its back part, also located on the line Y Y. Q is a piece, having, at one end, a head with two knuckles, o o, and at the other end being linked to the bolt-piece P, having a sliding motion parallel to the line z z', in suitable guides P' P'. Two pieces, R R, are fitted between the knuckles o o and N and bolt M. The pieces L R Q R and bolt M are now linked together by straps r r, so that when the piece Q is pushed in the direction of the arrow, fig. 6, and that all the knuckles are on a line, the die J' will be brought in contact with the die J, and, when the piece Q is moved in the opposite direction to the arrow, the links r r will cause the movable piece L to swing open around the centre L', and separate the dies J and J'. The bolt M is adjusted by proper fillers in the pieces a a, to make up for any wear and tear. It will be observed that when the dies J J' are closed, the pieces R R, head Q, piece L, and bolt M being all on a line drawn from the bolt M, (immovable,) and the centre of resistance of the said dies J J', the dies J J' cannot spread apart without crushing the pieces R R, piece Q, or piece L, or without breaking the bolt M; thus, with a power employed comparatively small, the dies J J' will be able to gripe a bar of red-hot iron with a resistless grasp, this being the result which I have in view.

Figure 3:
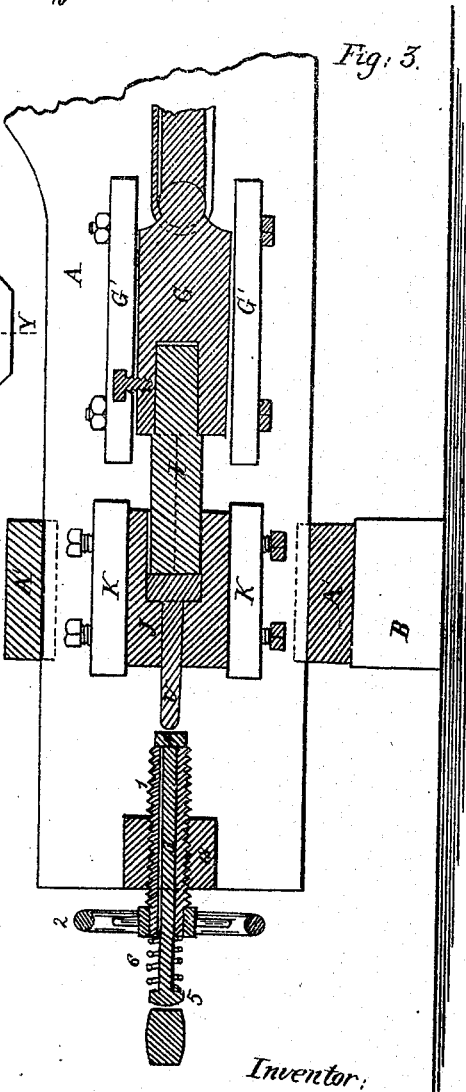

Thirdly, combination and arrangement of mechanical devices for obtaining an accurate guide to determine the length of the bolt to be made, and in the same time for driving the finished bolt from the dies J J' when they open. This part of my invention is represented in my drawings on plate 2, figs. 3, 4, 5, and 6, and the pieces are numbered. 1 is a hollow screw, having a wheel, 2, fastened to one end of it, and screwing into a nut, 18, fastened to the frame A in such a position that the centre of the screw 1 will be in a line with the point of the blank V, griped in the dies J and J'. 3 is a rod, passing through the hollow screw 1, and through the spiral spring 6, and having two heads, 4 and 5, one at both ends. The spring 6 will keep the head 4 in contact with the end of the screw 1, as seen in figs. 3 and 4. The head 4, being adjusted by screwing or unscrewing the screw 1 with the wheel 2, will serve as a guide for placing the blank V in the proper position in the dies J J', and thus make all the bolts of exactly the same length. 7 is a hammer, with a handle, 12, pivoted on a centre, 8, mounted on the plate 10. 11 is a rod, attached at one end to the end 20 of the piece Q, and having at the other end a catch and let-go arrangement of any suitable description for acting on the end of the handle 12 of the hammer 7, so as to pull said hammer away from the head 5 against the spring 14, and let it fly back when the dies J J' are open by the action of the piece Q. The hammer 7, on flying back, strikes the head 5, compressing the spring 6, driving the piece 3 and head 4 against the end of the finished bolt V, and drives it out of the dies J J' to make place for a new blank. The plate 10 is made adjustable on a proper bar, 15, fastened to the frame A, and is held stationary when adjusted by suitable screws. The length of the rod 11 is also made adjustable, so that all the combinations can have the same relative position, one with the other, when the length of the bolt to be made has to be changed, and the screw 1 adjusted anew.

Figure 5:
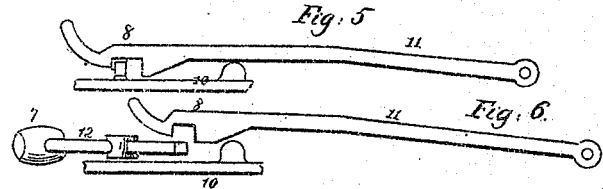
Figures 5 and 6 represent details.
Figure 6:
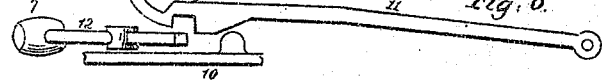

In figs. 5 and 6 I have represented a kind of catch and let-go arrangement, which is understood at a glance, fig. 5 representing the catch hooked on the handle 12, and fig. 6 representing the catch raised by the inclined plane of the rod 11, and letting go the handle 12. The bolts P P are moved by the cam-frames T T, pivoted on bolts T' T', and the cams S S, which act on the frames T T, are set in relation to the compound cam F, so that, when the piece D is raising, the cams S S open the dies J J', and that before the piece D falls the dies J J' are kept closed.

Operation.

The blank V is held to the proper place in the machine by tongs, and guided by proper side and bottom guides, not represented in my drawings, as being of no importance to my invention. The point of the blank V is held against the head 4, and the heated part away from said head 4. The dies J J', now closing, gripe firmly the blank V, as represented in fig. 4. The drop D falls, spreading apart the pieces G and G, forcing the heading-dies I I (see figs. 3 and 4) against the heated part of the blank V with a very powerful force, yet not like, in a cam-motion machine, with a strictly limited motion.

If more metal were left in the blank V than was required for making the head of the proper thickness, instead of something having to spring or break, as in positive-motion machines, all that will happen is that the piece D will not fall quite to its lower mark, and this lack of motion in the piece D will indicate that the blank V was too long, or too far engaged in the griping-dies J J'.

I have represented my bolt-machine as double, and it is in that manner I prefer to construct it, for, by this arrangement, two bolts, one at each end of the machine, can be made at one blow, but the machine can be built so as to act only on one end, having, in that case, only one knuckle, e, on the piece D, one piece H, one piece G, &c., &c.

Claims.

What I claim as my invention, and desire to secure by Letters Patent of the United States, is—

The combination of the piece D, guides $d\ d$, and frame A, with the pieces H H, bolts G G, and griping-dies J J', guides G' G' G' G', arranged and operating substantially in the manner and for the purpose set forth.

The compound cam F and block F', in combination with the drop-piece D, to obtain a vertical upward motion of said piece D, in the manner specified, and for the purpose stated.

The hollow screw 1, bolt 3, and nut 18, in combination with the hammer 7, or its equivalent, and the griping-dies of a bolt-making machine, substantially in the manner and for the purpose specified.

ABRAM ALEXANDER. [L. S.]

Witnesses:
 THOMAS S. MAPLE,
 JOHN MORROW.